United States Patent
Henderson et al.

(10) Patent No.: US 10,619,324 B1
(45) Date of Patent: Apr. 14, 2020

(54) PLACEMENT AREA RENEWAL SYSTEMS AND METHODS

(71) Applicant: Placement Area Solutions, LLC, Kingwood, TX (US)

(72) Inventors: Clayton Henderson, Kingwood, TX (US); Alan Morris, Kingwood, TX (US); Nathan Wilkes, Kingwood, TX (US)

(73) Assignee: Placement Area Solutions, LLC, Kingwood, TX (US)

( * ) Notice: Subject to any disclaimer, the term of this patent is extended or adjusted under 35 U.S.C. 154(b) by 0 days.

(21) Appl. No.: 16/250,481

(22) Filed: Jan. 17, 2019

(51) Int. Cl.
| | |
|---|---|
| *E02F 5/24* | (2006.01) |
| *E02D 17/18* | (2006.01) |
| *E02B 3/10* | (2006.01) |
| *C04B 18/04* | (2006.01) |
| *C02F 103/00* | (2006.01) |

(52) U.S. Cl.
CPC .......... *E02D 17/18* (2013.01); *C04B 18/0436* (2013.01); *E02B 3/10* (2013.01); *C02F 2103/007* (2013.01); *C02F 2201/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,705,851 A | * | 12/1972 | Brauer | B09B 1/00 210/747.7 |
| 3,777,375 A | * | 12/1973 | Smith | E02F 3/9231 37/326 |
| 4,184,958 A | * | 1/1980 | Manchak, Jr. | B09B 3/0041 210/170.09 |
| 4,312,762 A | * | 1/1982 | Blackburn | E02F 3/88 210/170.04 |
| 4,541,927 A | * | 9/1985 | Breidenbaugh | E02F 7/065 210/122 |
| 4,818,390 A | * | 4/1989 | Manchak, Jr. | B09B 1/00 210/170.08 |
| 4,854,058 A | * | 8/1989 | Sloan | E02F 3/88 37/323 |
| 4,929,353 A | * | 5/1990 | Harris | B01D 29/05 210/237 |
| 5,042,178 A | * | 8/1991 | Dutra | E02F 7/065 37/195 |
| 5,167,841 A | * | 12/1992 | Mims | B01D 21/245 210/241 |
| 5,656,174 A | * | 8/1997 | Hodges | B01D 29/01 210/705 |

(Continued)

Primary Examiner — Benjamin F Fiorello
(74) Attorney, Agent, or Firm — Osha Liang LLP

(57) ABSTRACT

A method for renewing a placement area may include one or more of the following steps. A dredge barge may be disposed inside a placement area containing materials dredged from one or more other locations and disposed within the placement area. Material may be dredged from the placement area. The dredged material may be processed. Water may be added to the placement area to maintain a flotation level of the dredge barge. The dredge barge may be removed from the placement area. The water may be removed from the placement area. This process may allow a placement area to be continually renewed and may allow useful materials to be recovered from a placement area.

15 Claims, 9 Drawing Sheets

(56) References Cited

U.S. PATENT DOCUMENTS

| | | | | |
|---|---|---|---|---|
| 5,901,475 A * | 5/1999 | Wilson, Sr. | ............... | B09B 1/00 37/195 |
| 5,938,936 A * | 8/1999 | Hodges | ................. | B01D 29/05 210/705 |
| 6,119,375 A * | 9/2000 | Wilson, Sr. | ............... | B09B 1/00 37/195 |
| 6,180,012 B1 * | 1/2001 | Rongved | ................. | B01D 53/62 210/717 |
| 6,293,731 B1 * | 9/2001 | Studer | ...................... | B09C 1/08 106/697 |
| 6,835,314 B2 * | 12/2004 | Keller | ................... | B01D 29/27 210/710 |
| 6,863,807 B2 * | 3/2005 | Crawford, III | ........... | E02B 8/02 210/170.09 |
| 6,922,922 B2 * | 8/2005 | Cheramie | ................ | B09B 1/00 37/307 |
| 7,005,064 B2 * | 2/2006 | Keller | ................... | B01D 29/27 210/170.04 |
| 7,089,693 B2 * | 8/2006 | Collins | .................. | E02F 3/902 37/309 |
| 8,926,221 B2 * | 1/2015 | Hwang | ................... | B09B 1/006 405/129.57 |
| 9,260,314 B2 * | 2/2016 | Constantz | ................. | C01F 5/24 |
| 9,394,677 B2 * | 7/2016 | Albers | ..................... | E03F 5/103 |
| 10,124,345 B2 * | 11/2018 | Nelson | ...................... | B03B 7/00 |
| 2002/0059740 A1 * | 5/2002 | Murray | ................ | E02F 3/8841 37/317 |
| 2006/0222463 A1 * | 10/2006 | Subbarayan | ............. | B09B 1/00 405/129.85 |
| 2009/0148238 A1 * | 6/2009 | Smith | ...................... | B09B 1/00 405/129.2 |
| 2009/0304447 A1 * | 12/2009 | Buhr | ...................... | E02B 3/121 405/17 |
| 2013/0075344 A1 * | 3/2013 | Wade | ................... | C02F 11/121 210/747.4 |
| 2014/0369762 A1 * | 12/2014 | Albers | .................... | E03F 5/103 405/129.6 |
| 2015/0117954 A1 * | 4/2015 | Hwang | ..................... | E02B 3/126 405/128.15 |
| 2015/0158032 A1 * | 6/2015 | Nelson | ..................... | B03B 7/00 705/7.28 |

* cited by examiner

PLACEMENT AREA RENEWAL SYSTEMS AND METHODS

FIELD OF THE DISCLOSURE

Embodiments herein relate to the renewal of dredge material placement areas (DMPAs), and to formation of product streams from materials disposed in placement areas.

BACKGROUND

Creating and maintaining ship channels, ports, and other man-made waterway formations requires the removal of material from the bottom of navigable water ways. Frequently, the material is dredged from the water way and disposed in a dredged material placement area (commonly referred to as a placement area), which typically consists of an enclosed levee structure on land relatively near the dredge site, so that the material may be readily transported from the dredge site to the placement area. The material disposed of in a placement area may comprise a mixture of solids and liquids, and typically dry out after its disposal in the placement area. Accordingly, the upper surface of material in a placement area may comprise a solid "crust" layer, while deeper material may have a semi-solid consistency. Because of persistent shoaling, most navigable water ways require continuous dredging to maintain the depth and width of a navigable water way through ongoing dredging operations. In many cases, the areas around dredge sites are occupied by industrial, commercial or residential areas and there is limited space for placement areas. Additionally, as placement areas become filled with dredge material, placement area owners begin a continuous cycle of furrowing ditches into the contained dredge material to create surface area and dry the material, thereby compacting it to gain capacity. Eventually, levees must be raised at the risk of levee instability and ultimate failure, chancing a material breach. Therefore, it may be advantageous to reuse placement areas by removing the material completely so they can be filled with dredged material again.

Excavating placement areas has been proposed in the past as a method for allowing their reuse. Previous attempts have included operations such as using an excavator or backhoe to "mechanically" dredge material from the placement area. The material is loaded onto a truck or barge and moved to a beneficial use or secondary disposal site. The secondary disposal site may be a landfill or an EPA-designated offshore site. This method presents several shortcomings. First, because the material in the placement area must be sufficiently dry before it can be excavated using traditional earth moving equipment, this method requires leaving the placement area unused for a long period of time (typically years) after it is filled. This process may be considered a drying cycle. This results in downtime during which the placement area cannot be used. Second, this method merely moves material from one disposal area to another, which is very inefficient. Third, if amphibious "marsh buggie" excavation equipment was to be used to remove the material, negating the need for long drying time, removal would take a very long time and would be very uneconomical. Lastly, to create more capacity in existing placement areas, levee raises may occur and essentially increase the available volume of the placement area. However, this is not sustainable because there are limits to how tall these levees can be built before they fail under their own weight or become too costly to build. Creating a new placement area is rare because of federal permitting constraints and is also a costly endeavor due to the non-availability of real estate along ship channels, especially in industrialized areas. Therefore, these traditional methods may experience potential losses in the form of placement area downtime, costly and inefficient use of secondary disposal areas, or uneconomical means of dredged material removal.

SUMMARY OF THE DISCLOSURE

The present disclosure is directed towards a method of utilizing a placement area which overcomes the shortcomings described above. Methods and systems in accordance with the present disclosure may allow placement area capacity to be fully and frequently renewed and may allow commercial use of the removed dredge material, thereby creating a semi-perpetual placement area.

In one aspect the present disclosure relates to a method for renewing a placement area which may include the following steps: disposing a dredge barge inside a placement area containing materials dredged from one or more other locations and disposed within the placement area; dredging material from the placement area; processing the dredged material; adding water to the placement area to maintain a flotation level of the dredge barge; removing the dredge barge from the placement area; and removing the water from the placement area.

In another aspect, the present disclosure relates to a system which may include: at least one dredge barge disposed in a placement area containing placed material; and at least one aggregate processing facility. The dredge barge and the aggregate processing facility, may be fluidly connected in series. A system according to the present disclosure may include at least one water clarification package.

Other aspects and advantages will be apparent from the following description and the appended claims.

DETAILED DESCRIPTION

Figure 1:
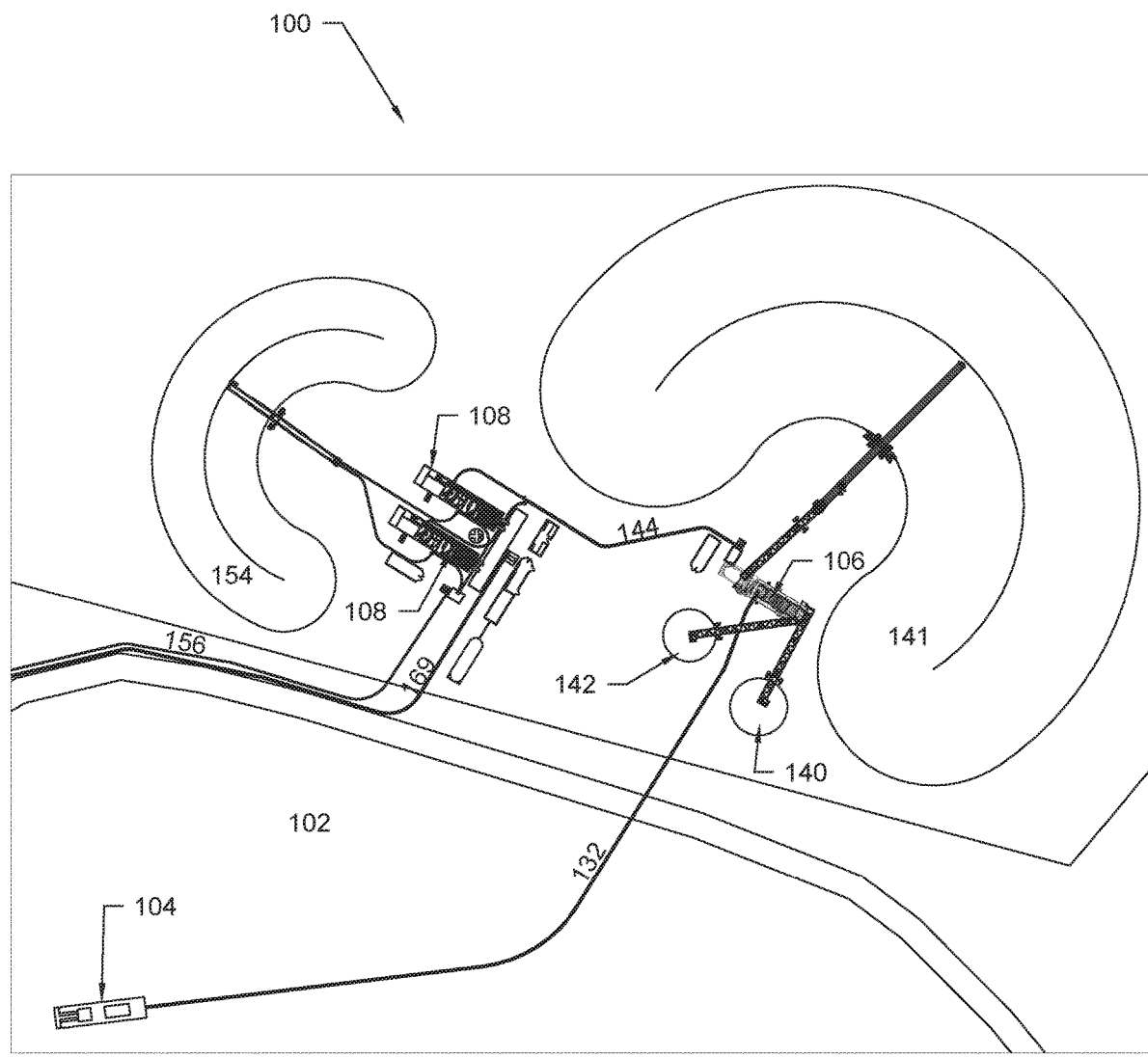
FIG. 1 illustrates a placement area renewal system in accordance with the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates to methods and systems which enable the reuse of placement areas. The methods and systems may include or enable the recovery and reuse of materials from placement areas. Accordingly, the methods and systems disclosed herein may provide a time and cost efficient way to renew placement areas in a variety of conditions.

Placement areas, as noted above, may contain materials dredged from one or more other dredge locations and disposed within the placement area. Materials disposed in a placement area may include silt, sand, gravel, clay, debris, rock, and other materials as may naturally occur in a waterway. Materials disposed in a placement area may also include trash and other man-made objects, such as tires, plastics, trash, and other objects disposed in or making their way to the waterway, as well as residual hydrocarbons or other contaminants resulting from spills or other waterway usage by boats, etc.

Methods of material recovery and placement area renewal in accordance with the present disclosure may utilize a placement area renewal system according to embodiments herein. A placement area renewal system may include a dredge barge, an aggregate processing facility, and a water clarification facility, among other processing and auxiliary processing units. In some embodiments, the aggregate processing facility and/or the water clarification facility may be mobile units, as will be described further below.

The material recovery and processing may include disposing a dredge barge inside a placement area, the placement area containing materials dredged from one or more other locations and disposed within the placement area. The materials previously disposed in the placement area may then be dredged from the placement area and processed using a placement area renewal system. As the material is dredged from the placement area, water may be added to the placement area to maintain a flotation level of the dredge barge. After the materials are dredged from the placement area and processed by the aggregate processing facility and water clarification facility, the dredge barge may be removed from the placement area. The water may then be removed from the placement area and clarified through the water clarification facility before being discharged, thereby providing a renewed placement area, suitable for future use when needed to dispose dredged materials from nearby waterways to create or maintain ship channels and the like.

Processing the dredged material may include separating the dredged material from the placement area to recover one or more solids fractions. The solids fractions may include one or more of: an oversize debris fraction, such as chunks of tires or other man-made waste; an oversize usable material fraction; a rock fraction, such as rocks or aggregates; a gravel fraction, a sand fraction, and a silt and clay fraction. These fractions and are exemplary, as additional solids fractions may be recovered, as may be suited to a particular placement area renewal project.

An aggregate processing facility useful in embodiments herein may process the material dredged from the placement area via size, density separation, and/or other treatment methods to recover, for example, an oversize debris fraction, an oversize product fraction, a sand fraction, and a slurry comprising water, clay, silt, and possibly sand. The clay/silt fraction may be further dewatered to allow for the stacking of this fraction. The recovered water from any sediment fraction may be clarified, and, in some embodiments, the clarified water may be returned to the placement area. In some embodiments, water from an external source may alternatively or additionally be added to the placement area. The placement area may also be flooded with water prior to disposing the dredge inside the placement area.

Separating the dredged material may include, for example, separating the dredge material by size exclusion to process the slurry using one or more oversize debris and/or product fractions, where the one or more oversize debris or product fractions may include one or more of a large trash fraction, a gravel or other large material fraction, or a sand fraction.

In some embodiments, processing the dredged material may include additional steps such as mixing an additive with the dredge material or a fraction thereof or treating the dredge material or a fraction thereof. Various additives or processing aids useful in embodiments herein are discussed further below.

Placement area renewal methods according to embodiments herein may also include testing material disposed in the placement area to determine a composition of the material disposed in the placement area, for example for the presence of hazardous materials, such as hydrocarbons, determine clay or rock compositions, or content of other desired compounds or minerals. The testing may include taking samples from multiple zones of the placement area, for example performing a detailed grid punch. A dredging schedule may be planned based on the testing. Should a particular zone tested be found to contain a hazardous material, the dredging plan may include avoidance or isolation of the area in which the hazardous material is located; alternatively, processing equipment may be included in the placement area renewal system to accommodate the hazardous material via removal or treatment which would otherwise have to be performed off site and incur higher costs due to additional transportation and other factors.

Following processing of the material previously disposed in the placement area, the placement area may still contain water that was used to maintain a flotation level of the dredge barge. Once the dredge barge is removed from the placement area, the water may or may not be removed from the placement area, thus providing an empty placement area (renewing the placement area) in which additional dredge materials from nearby waterways may be disposed. Removing water from the placement area may include disposing one or more pumps in the placement area and pumping the water out of the placement area. The pumps may then be removed from the placement area.

Placement area renewal methods according to embodiments herein may be performed using mobile or modular equipment that may be readily transported between sites and set up for use. For example, a mobile aggregate processing facility and a mobile water clarification facility may be disposed proximate the placement area, such as on the placement area levy, proximate the levy, or a short distance from the levy. Preferably, the mobile aggregate processing facility and the mobile water clarification facility are placed such that sufficient area surrounding each may be used for accumulation of aggregate products or other minerals, sand, clay, and other fractions that may have a valuable end use.

The mobile aggregate processing facility and the mobile water clarification facility may be positioned such that trucks, trains, barges, or other vehicles may be used to transport the accumulated products. Alternatively, a permanent facility may be constructed on site to accomplish the tasks depending on any given project's estimated duration and production estimates.

After placement, the mobile aggregate processing facility may be fluidly connected to the dredge. The mobile aggregate processing facility may also be fluidly connected to the mobile water clarification facility. The method may also include disposing auxiliary or supplemental equipment, such as crushing equipment, pugging equipment, log washers, blade mills, classifiers, conveyors, loaders, dryers, bag houses, silos, water or slurry holding or storage tanks, weigh scales, fuel storage tanks, pumps, power generators, electrical and control systems, and other equipment proximate the placement area. The supplemental or auxiliary equipment may be used to aid in further processing and/or transporting various product fractions within the aggregate processing facility and the water clarification facility to stockpile areas, further processing of various product fractions, as well as loading product onto trucks or other transport, fueling the dredge barge, or other functions that may aid in operation of the placement area renewal system.

After their use in processing the material dredged from the placement area, each system may be disconnected, the mobile aggregate processing facility from the dredge and the mobile water clarification facility from the mobile aggregate processing facility and readied for transport to another site for use in renewing another placement area. This is also somewhat possible for permanent equipment, but there may be some components (e.g. concrete structures) that will remain on site and need to be created again at a new site.

As noted above, systems for placement area renewal and material recovery according to embodiments herein may include: at least one dredge barge; at least one aggregate processing facility; and at least one water clarification package. In some embodiments, one or more of these elements may be omitted from the system; for example, for a placement area that does not include clays or silts, a water clarification system may be omitted or a "minimal" water clarification package may be used. The dredge barge, the aggregate processing facility, and the water clarification package may be fluidly connected in series but may be connected in parallel to supplemental systems to allow for additional plant throughput capacity. Each of the aggregate processing facility and the water clarification package may include one or more separators. The system may further include a water return line configured to carry water from a water clarification package to a placement area. Components of the system may be mobile, modular, and/or permanent.

As outlined briefly above, the present disclosure relates to a system for renewing a placement area. Systems in accordance with the present disclosure may include some or all of the equipment described herein, as well as additional equipment. In general, the system may include equipment designed to remove material from a placement area and to recover specific materials from the removed material. FIG. 1 illustrates a placement area renewal system 100 located at a placement area 102. FIGS. 2-6 illustrate details of the system 100 and FIGS. 7-8 illustrate details of the placement area. Like components are labeled with like numbers in FIGS. 1-8.

The placement area renewal system 100 may include a dredge barge 104, an aggregate processing facility 106, and a water clarification package 108. The dredge barge 104, an aggregate processing facility 106, and a water clarification package 108 may be connected to each other via one or more flow lines. In some embodiments, the system 100 may include more than one dredge barge 104, more than one aggregate processing facility 106, and/or more than one water clarification package 108.

Figure 2:
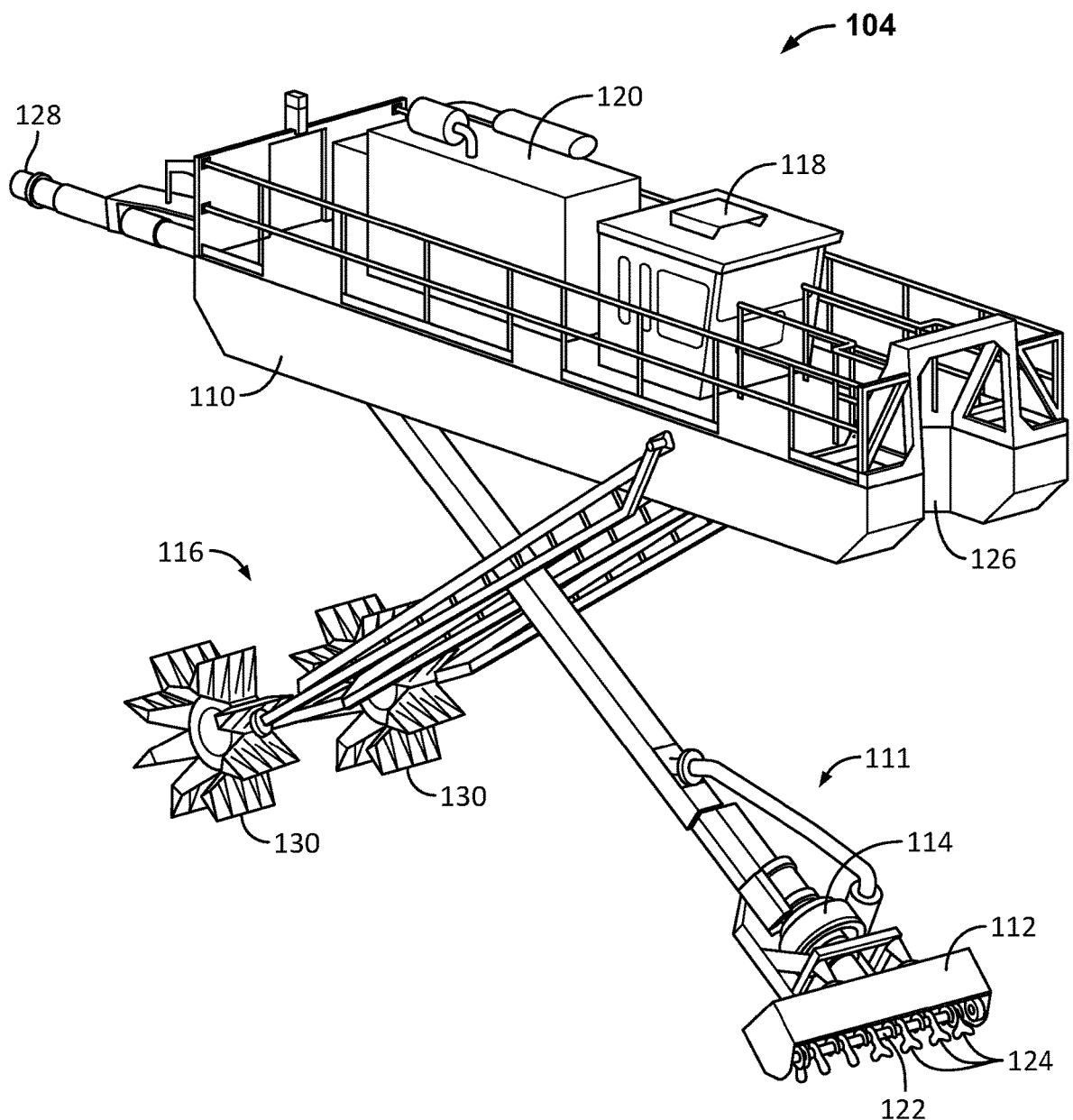
FIG. 2 is a dredge barge useful in embodiments of the placement area renewal system in accordance with the present disclosure.

FIG. 2 illustrates one type of dredge barge 104 useful in placement area renewal systems according to embodiments herein. The dredge barge 104 may include a hull 110, a dredging mechanism 111, and a propulsion mechanism 116. During operation of the dredge barge 104, the hull 110 may be disposed in water, floating above the placement area, while the dredging mechanism 111 and the propulsion mechanism 116 may be disposed below the waterline. The hull 110 may be designed to provide buoyancy and stability for the dredge barge 104 during dredging. While the dredge barge may be similar to dredges used in open waters, such as to form or maintain ship channels, the dredge barge may also be of smaller size and of different design, as being used within a placement area, for which the design requirements may be different.

The hull may hold an operator station 118. The operator station 118 may allow for manual or autonomous control of the dredge barge 104, including steering and control over dredging operations. The operator station 118 may include a joystick or other steering mechanism, a depth gauge, and/or doors to allow access to the port and the starboard side of the hull 110. In some embodiments, the steering mechanism may be programmable, and may be configured to steer the dredge barge based on the dredging schedule planned for the placement area, such as resulting or planned following sampling and mapping of the placement area compositional analyses.

The hull may also include a power unit 120. The power unit 120 may provide power to the dredging mechanism 111 and the propulsion mechanism 116. Auxiliary equipment brought to the placement area may include fuel storage, such as may be used to provide fuel, as needed, to the dredge barge for continued operations.

The dredging mechanism 111 may include a cutter head 112 and a dredge pump 114. The cutter head 112 and the dredge pump 114 may be disposed below the hull 110. A pulley system 126 may be used to adjust a depth of the cutter head 112 below the hull 110. The cutter head 112 may include an inlet 122 with one or more cutters 124 disposed thereon. The cutters 124 may be capable of cutting solid or semi-solid material into pieces which can fit into the inlet 122 and be transported through conduits connecting the dredge pump to a downstream unit, such as the aggregate processing facility. For example, the cutters 124 may be carbide steel rotary teeth and may be powered by one or more motors. The motors may be a dual-recessed hydraulic drive motor. In some embodiments, the cutters 124 may cut material into pieces smaller than eight inches in diameter, smaller than six inches in diameter, or smaller than four inches in diameter. In some embodiments, the cutter head 112 may be shrouded, which may reduce turbidity of the fluid which enters the cutter head 112. In some embodiments, the cutter head 112 may include a self-cleaning debris guard, or other mechanism to prevent debris from becoming lodged in the cutter head 112. While it is anticipated that the placement area may include only material previously dredged, agglomeration of materials or disposal of other materials in the placement area may require the dredge barge to include the above-described cutters for proper operation.

The dredge pump 114 may be connected to the cutter head 112, such that the dredge pump 114 suction may uptake pieces of material cut by the cutter head 112 or otherwise dislodged from the bottom surface of the placement area. This material may be considered a raw dredge flow, and may be a slurry including a mixture of solids and water. In some embodiments the only liquid in the raw dredge flow may be water, while in other embodiments, the raw dredge flow may include both water and other liquids, such as hydrocarbons or other substances as may be present or resulting from use of the placement area.

The raw dredge flow may include solid particulates of a variety of sizes. The maximum size of the solid particulates in the raw dredge flow may be the diameter to which the cutter head 124 cuts material. The dredge pump 114 may have sufficient power to move the solid particulates. The dredge pump 114 may be a submersible hydraulic drive pump or any other type of pump capable of handling the raw dredge slurry and providing sufficient discharge pressures to transport the raw dredge slurry to downstream processing equipment. The dredge pump 114 may be capable of pumping a slurry containing a relatively high percentage of solids by volume. The dredge pump 114, as noted above, should be capable of moving the raw dredge flow a significant distance, for example up to 1000 feet, up to 2000 feet, up to 3000 feet, or more than 4,000 feet, depending upon the size of the placement area, the proximity to the placement area in which the aggregate processing facility may be disposed, and numerous other factors readily recognized by those skilled in the art.

The dredge pump 114 and the cutter head 112 may be connected to a discharge 128. The dredge pump 114 may pump the raw dredge flow away from the dredge barge 104 through the discharge 128 through a hose or other fluid connection for transporting the raw dredge material to downstream processing, such as the aggregate processing facility. In some embodiments, the discharge 128 may be supported by the hull 110 and may be located approximately on or near the water surface.

The propulsion mechanism 116 may be a self-propulsion mechanism, which may operate without cables or spuds. As illustrated in FIG. 2, the propulsion mechanism 116 may include one or more star wheels 130, which may be driven by the power unit 120. The position of the star wheels relative to the hull 110 may be adjustable.

While the dredge barge as illustrated in FIG. 2 may be useful in placement area renewal systems according to embodiments herein, one skilled in the art will recognize that other types of dredging equipment capable of dredging the material in the placement area could be used in place of or in addition to the dredge barge 104 described above without departing from the scope of the present disclosure. The dredging equipment may use suction dredging, mechanical dredging, or other dredging mechanisms for removing solids from a floor of a placement area and transporting the slurry to a downstream processing unit, such as an aggregate processing facility.

Figure 5:
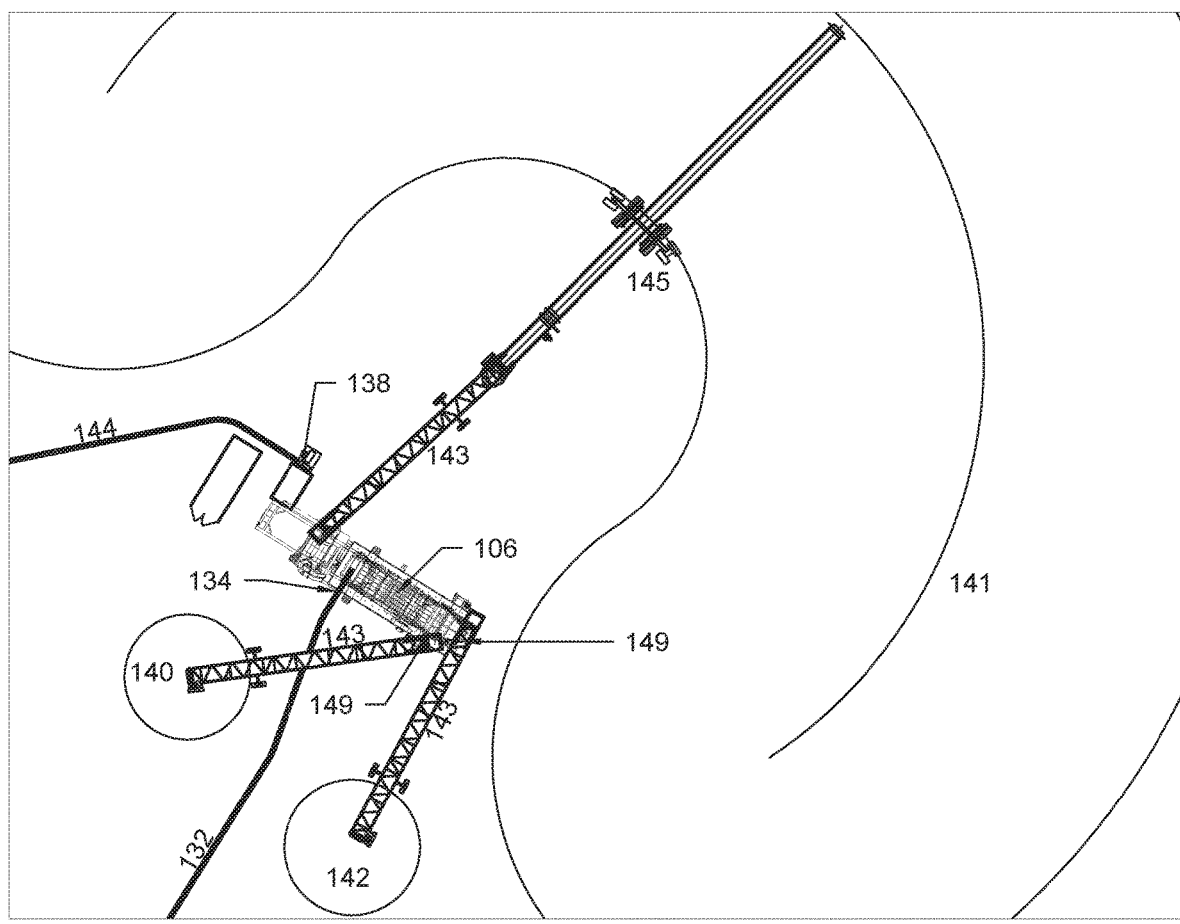
FIG. 5 illustrates a portion of a placement area renewal system in accordance with the present disclosure.

As shown in FIGS. 1 and 5, the placement area renewal system 100 may include a raw dredge feed line 132 fluidly connect the dredge barge 104 and the aggregate processing facility 106. The raw dredge feed line 132 may be connected to the discharge hose 128 of the dredge barge 104. The raw dredge feed line 132 may have sufficient length and flexibility to accommodate movement of the dredge barge 104. The diameter of the raw dredge feed line 132 may be determined based on the flow output by the dredge barge 104 and the cutter size. As discussed above, the material output by the dredge barge 104 and carried through the raw dredge feed line 132 may comprise a mixture of solids and liquids, including solid particulates of a variety of sizes.

Figure 3:
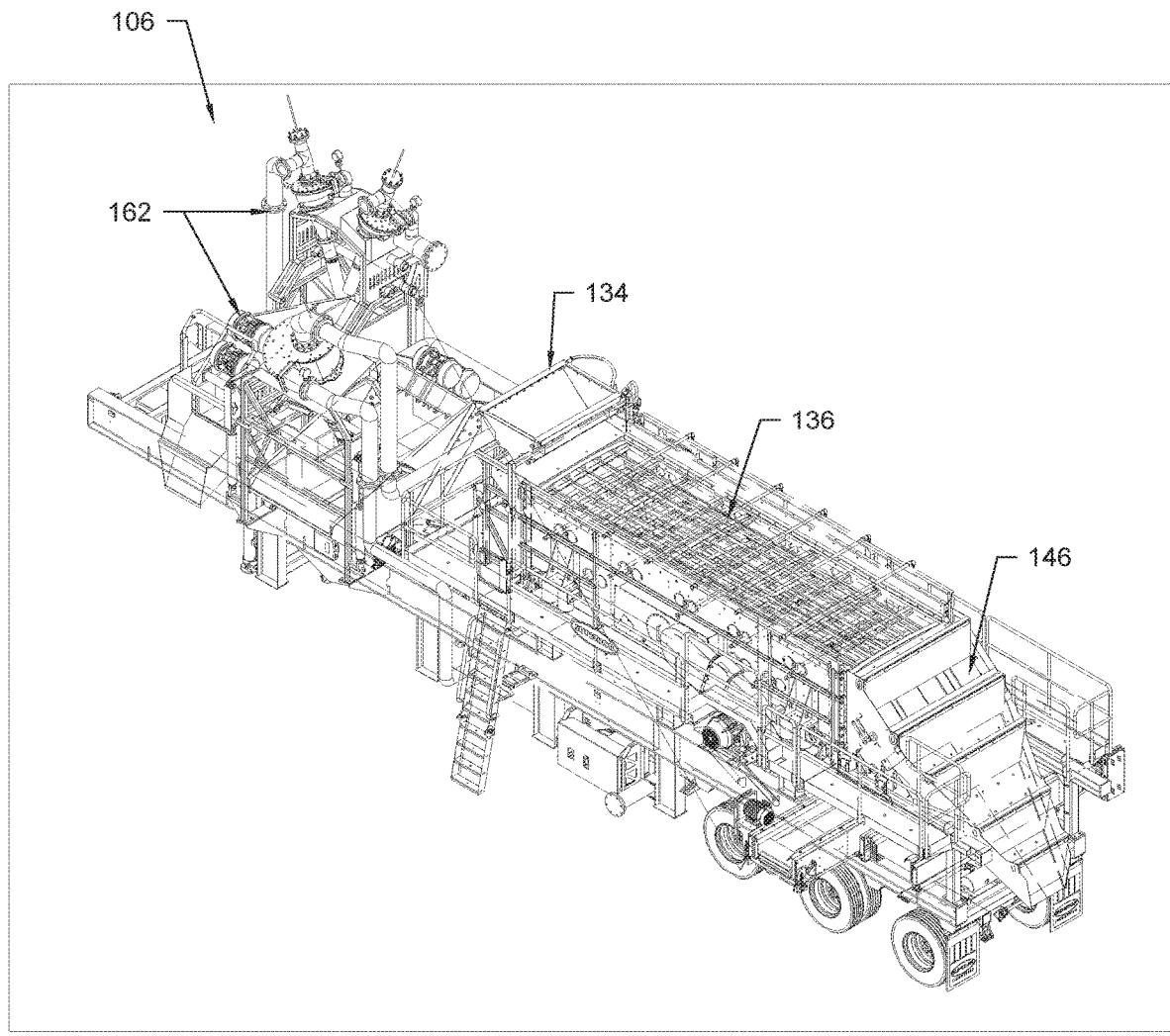
FIG. 3 is an aggregate processing facility useful in embodiments of the placement area renewal system in accordance with the present disclosure.

FIGS. 3 and 5 illustrate embodiments of an aggregate processing facility 106 useful in placement area renewal systems herein. The aggregate processing facility 106 may include an inlet 134, one or more scalper screens 136, a sump and pump 138, and one or more solids outlets 149. Scalper screens 136 may include one or more of a shaker screen decks or other types of separators useful for separating solids from a slurry. The aggregate processing facility 106 may also include one or more pumps (not shown) or conduits (not shown) to facilitate the flow of material from the inlet 134 to the sump and pump 138 through the one or more scalper screens 136.

The raw dredge feed line 132 may be connected to the inlet 134 and may carry the raw dredge flow to the inlet 134 of the aggregate processing facility 106, which may deposit the raw dredge flow on a top scalper screen or layer of the scalper screen 136, for example. The scalper screen 136 may include one or more layers, each layer comprising a mesh. The raw dredge material may flow across and through the top of the scalper screen 136 to the bottom of the scalper screen 136. Moving from the top to the bottom of the scalper screen 136, the size of the holes in the screen of each layer may decrease. In this way, each layer of the scalper screen 136 may capture increasingly smaller particulates from the raw dredge material. The particulates captured by the uppermost layer may be approximately the largest size of particulates cut by the dredge barge 104, for example having a diameter of greater than 1 inch up to about eight inches, six inches, or four inches. The particulates captured by the lowermost layer may have a diameter of greater than two centimeters, greater than one centimeter, greater than half a centimeter, greater than one millimeter, greater than half a millimeter, or greater than 0.0625 mm (lower bound for sand particles), for example. The scalper screen 136 may include any number of layers and screen sizes to facilitate the recovery of multiple product fractions of a desired particle size distribution. Intermediate layers between the uppermost layer and the lowermost layer may capture particulates of sizes between those described above.

After the solid particulates of the sizes described above have been removed, the remaining material may comprise a slurry, or a mixture of liquids and small solid particulates, such as sand, silt, and clay. The largest solid particulates in the remaining slurry may be of a size that can fit through the lowermost mesh of the scalper screen 136. A hydrocyclone 162, or series of hydrocyclones, may be used to separate the sand, or other coarse to fine aggregate, from the clays and silts and are deposited onto a dewatering screen for dewatering and are then conveyed to a stockpile 141 by use of conveyors such as 143 and 145. The remaining slurry, consisting of silts, clays, and any uncaptured sand, may exit the aggregate processing facility 106 through the sump and pump 138.

As shown in FIGS. 1 and 5, the particulates removed from the dredged material by the aggregate processing facility 106 may be disposed of at one or more product accumulation stockpiles, such as a large product accumulation site 140, a sand accumulation stockpile 141, and/or a waste stockpile 142. Additional outlets and accumulation stockpiles may also be provided. Product stockpiles 140, 141 may be used to collect particulates which may be reused. Particulates which cannot be reused may be collected at the waste stockpile 142. Augers, flow lines (not shown) and/or conveyers 143 may be connected to respective outlets of the scalper screen 136 of the aggregate processing facility 106, and may carry the sand, gravel, waste, and other particulates to the product stockpiles 140, 141 and waste stockpile 142.

In some embodiments, augers or conveyors 143 may carry materials from the aggregate processing facility 106 to the stockpiles 140, 141, 142. For example, oversize material collected from the uppermost screen separator may be recovered via slide 146, and then transported via a conveyor 143 to waste stockpile 142. In some embodiments, all reusable particulates may be collected at a single product stockpile 140, while in other embodiments, different reusable particulates may be collected at different product stockpiles 140, 141. For example, gravel may be collected at a first product stockpile 140, while sand is collected at a second product stockpile 141.

As illustrated in FIG. 5, one or more product stockpiles 141 may include an auger or conveyor 143 which may be configured to feed a stacking conveyor 145. The stacking conveyor may include a number of drives enabling positioning or movement of the stacking conveyor 145 to distribute aggregates over the entire range of a large product stockpile 141. Positioning of the stacking conveyor may be controlled, in some embodiments, so as to manually place compositionally different material compositions recovered during the placement area renewal process in a predetermined location within a product stockpile 140, 141, 142, facilitating recovery of that fraction for later transport to an end user.

Particulates collected at a product stockpile 140 may be ready for reuse or may require further processing, such as cleaning. Cleaning may include removing adhered materials from the particulates via chemical treatment, mechanical treatment, or other means. One or more areas of the product stockpiles 140 and the waste stockpile 142 may include loading equipment and roads providing access for trucks, which facilitates the movement of the particulates to a place where they may be reused, sold, or disposed. One or more of the product stockpiles 140, 141, 142, or 154 may be used to store materials that may be reused at or returned to the placement area 102.

As shown in FIGS. 1 and 5, the system 100 may include a slurry line 144 fluidly connecting the aggregate processing facility 106 sump and pump 138 and the water clarification package 108. The diameter and other properties of the slurry line 144 may be determined based on the properties of the slurry output by the aggregate processing facility 106. As discussed above, the slurry carried through slurry line 144 may include a mixture of solids and liquids, including small solid particulates, such as clay, silt, and any uncaptured sands.

Figure 4A:
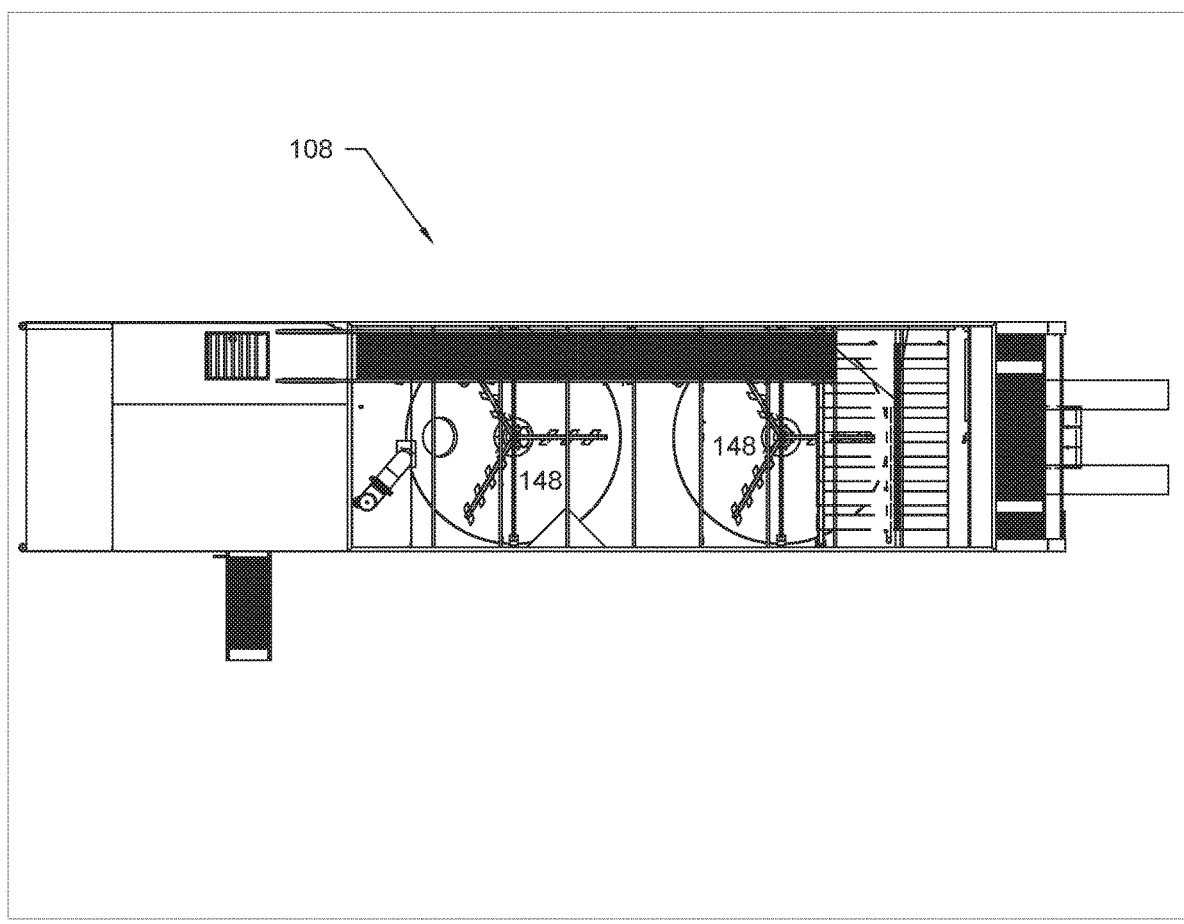
FIGS. 4A-4B are a water clarification package useful in embodiments of the placement area renewal system in accordance with the present disclosure.
Figure 4B:
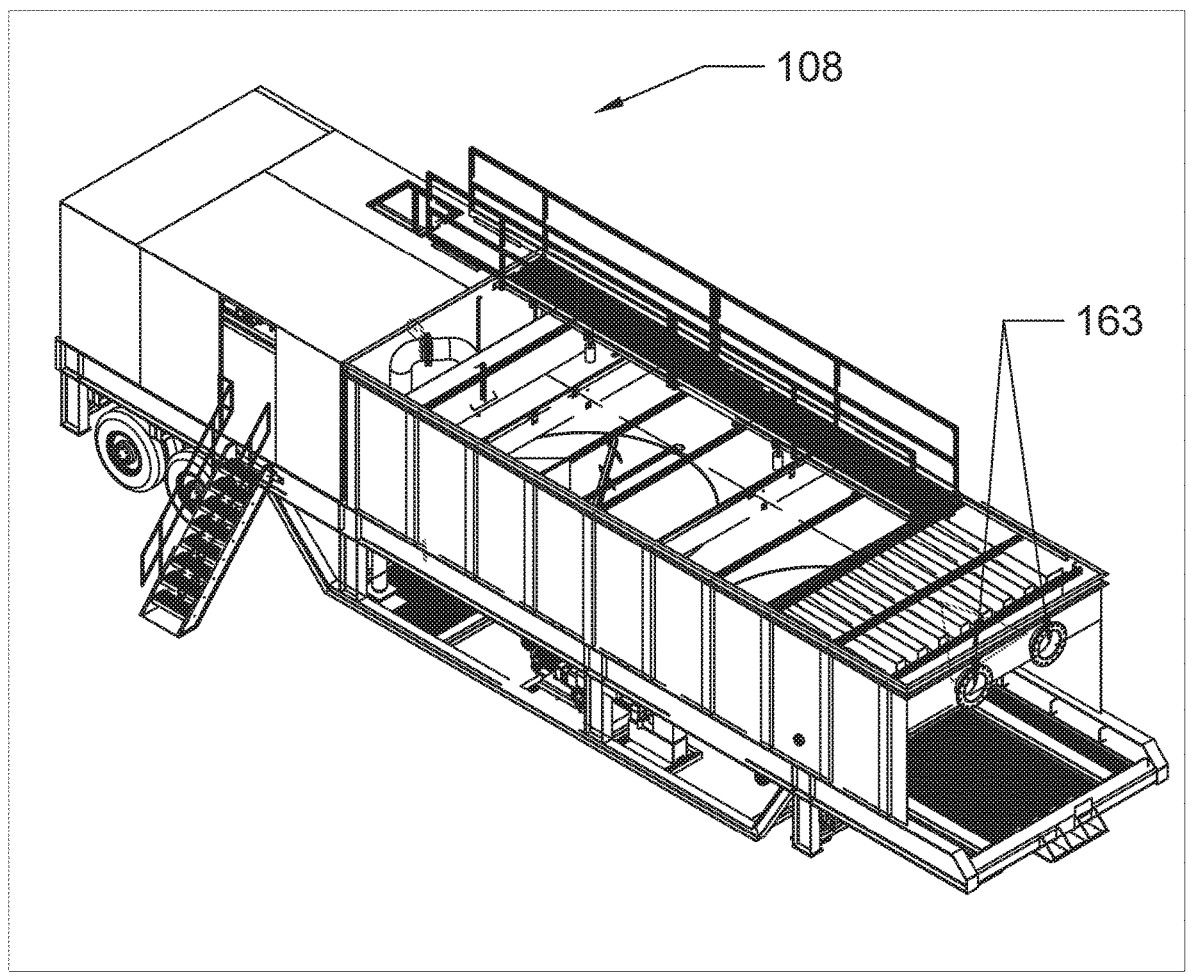
Figure 6:
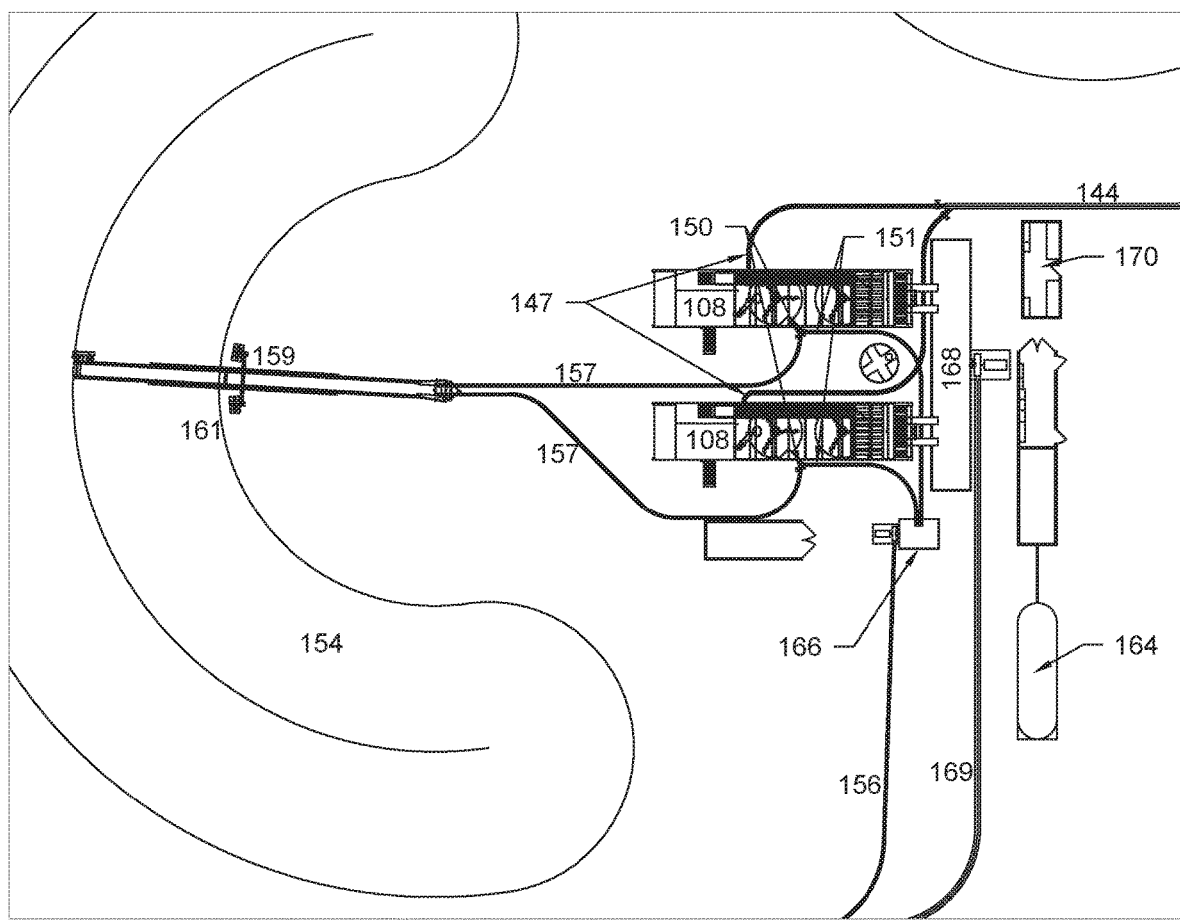
FIG. 6 is portion of is a placement area renewal system in accordance with the present disclosure.

FIGS. 4A, 4B and 6 illustrate a water clarification package 108 useful in placement area renewal systems described herein. The water clarification package 108 may include an inlet 147, one or more sediment collection areas 148, and an outlet 150. Each of the sediment collection areas 148 may comprise a vessel configured to receive slurry, which may have equipment disposed therein. The sediment collection areas 148 may include hydrocyclones, centrifuges, filters, and/or other separation technologies useful for removing small particulates from fluids. In some embodiments, the sediment collection areas 148 may include equipment which may perform chemical processes, such as for the treatment of sediment or to facilitate flocculation, settling or separation of sediments such as silt and clay from the water.

The slurry line 144 may be connected to the inlet 147 and may carry the remaining slurry from the aggregate processing facility 106 to the water clarification package 108. Each of the sediment collection area 148 may remove solid particulates, such as silt and clay, from the remaining slurry material, producing silt and clay product streams, as well as a clarified water product. Each sediment collection area 148 may be configured to remove solid particulates of a different size or having different properties. For example, a first sediment collection area 148 may remove silt and a second sediment collection area 148 may remove clay, from the slurry. The slurry may flow through the sediment collection area 148 successively, such that solid particulates of decreasingly small sizes are recovered from the slurry. After the solid particulates have been recovered, the clarified water may be recovered from the water clarification facility 108 via outlet 163. The clarified water which exits the outlets 163 may primarily comprise clean (clarified, non-potable) water, suitable for disposal in a nearby waterway or within the placement area, or otherwise used for cleaning or maintenance of equipment used in the placement area renewal system.

In some embodiments, the water clarification package 108 may include equipment (not shown) for mixing additives into the slurry. The equipment may be configured to mix in the additives before, during, or after processing of the material by the sediment collection areas 148. The additives may include processing aids, flocculants, or other materials which may aid in the separation of silt, clay, and other particulates from the water.

As shown in FIG. 6, the water clarification package 108 may include a fuel tank 164, which may provide fuel used to generate power to operate some or all equipment on site. In some embodiments the fuel tank 164 may also provide fuel to other components of the system 100, fuel tank(s) (not shown) located elsewhere within the system may provide fuel useful to generate power for the various needed operations (to power pumps, control systems, etc.). The fuel may be diesel or any type of fuel appropriate for the power generation means used. In some embodiments, the water clarification package 108 may include a dedicated operator station 170 which may control operation of the water clarification package 108 and other parts of the system 100 such as the aggregate processing facility, 106, sump and pump 138, conveyors 143, and stacking conveyors 145 and 159.

The water clarification package 108 may further include a contingency slurry sump and pump 166 and a water buffer tank 168. The sump 166 may be used, for example, to receive out of spec product from the water clarification system, or if the water clarification package 108 is shut down for maintenance or due to failure. If it is necessary to remove untreated or partially treated slurry from the water clarification package 108, the slurry may be fed via flow line 151 and pumped to the sump and pump 166.

Fresh water buffer tank 168 may be used to temporarily store clarified water produced by the water clarification system 108. Water from the water buffer tank 168 may be pumped into the water return line 169, which is described in more detail below. Fresh water buffer tank 168 may also provide clarified water for flushing or cleaning equipment during operation and use of the water clarification package.

As shown in FIGS. 1 and 6, the particulates removed from the dredged material by the water clarification package 108 may be disposed of at one or more product stockpiles 154. Product stockpiles 154 may be used to collect particulates which may be reused or sold as a product, such as useful clays. Flow lines 157 connected to outlets 150 of the sediment collection areas 148 may carry the silt, clay, uncaptured sands from the aggregate processing facility 106, and other particulates recovered from the slurry to the product stockpiles 154. In some embodiments, the flow lines 157 may include or be connected to stacking conveyor 159 for stacking of the recovered solids at product stockpile(s) 154. In some embodiments, all reusable particulates may be collected at a single product stockpile 154, while in other embodiments, different reusable particulates may be collected at different product stockpiles 154. For example, silt may be collected at a first product stockpile 154, while clay is collected at a second product stockpile 154. As illustrated in FIG. 6, one or more product stockpiles 154 may include a stacking conveyor 159 which includes motors for self-propulsion 161. The motors for self-propulsion 161 may include a drive or steering mechanism enabling positioning or movement of the stacking conveyor 159 over the entire range of a large product stockpile 154. Positioning of the stacking conveyor may be controlled, in some embodiments, so as to manually place compositionally different materials recovered during the placement area renewal process in a predetermined location within a product stockpile 154 facilitating recovery of that fraction for later transport to an end user.

Particulates collected at product stockpile(s) 154 may be ready for reuse or may require further processing, such as pugging. Pugging may include the addition of other materials such as sand or other chemicals and mechanical agitation, to homogenize the blend based on end user requirements. One or more areas of the product stockpile(s) 154 may include loading equipment and roads providing access for trucks, which facilitates the movement of the particulates to a place where they may be reused, sold, or disposed.

As illustrated in FIGS. 1 and 6, the system 100 may include a water return line 169 connected to the outlet of the water buffer tank 168 of the water clarification package 108. The water return line 169 may carry clarified water from the water clarification package 108 to the placement area 102. The clarified water may be substantially free of particulates and may meet standards for water being discharged into the environment. In some embodiments, the water return line 169 may carry the water to another location, such as a nearby waterway or a vehicle which may be used to move the water to a secondary location.

In some embodiments, the components of the placement area renewal system may comprise mobile equipment. The aggregate processing facility 106 and the water clarification package 108 described above may be mobile, such that they may be readily driven to and from a placement area. For example, these components may be disposed on the beds of trucks that may be driven on roads and positioned proximate to a placement area. Examples of such a configuration are illustrated in FIGS. 3-4. The trucks may also carry connectors such as flow lines necessary to connect the components to each other, to the dredge barge, or to other equipment. The mobile components may be brought to a placement area prior to renewal, and may be removed from the placement area after its renewal is complete. The mobile components may be used at different placement areas, as many placement areas may be found in remote locations.

In some embodiments, the components of the placement area renewal system may comprise modular equipment. The dredge barge 104, the aggregate processing facility 106 and the water clarification package 108 have been described separately above. In modular systems, they may be separately transportable and connectable. The system 100 may be configured such that it may include any number of dredge barges 104, any number of aggregate processing facilities 106, and any number of water clarification packages 108. Further, an aggregate processing facility 106 and/or a water clarification package 108 may be composed of multiple modular units, with each unit containing equipment necessary to perform specific, desired processes. For example, scalper screens 136 and sediment collection areas 148 may be individually added to an aggregate processing facility 106 or a water clarification package 108 based on the particular substances which are found in a placement area 102.

In a placement area renewal system 100 which includes multiple dredge barges 104, the dredge barges 104 may be connected in parallel with each other. This may allow a greater volume of dredged material to be processed in a given time. Such an arrangement may be advantageous at a placement area 102 containing a large amount of material, or one that is desired to be renewed particularly quickly.

In a placement area renewal system 100, which includes multiple aggregate processing facilities 106, the aggregate processing facilities 106 may be connected in parallel with each other. This may allow a greater volume of dredged material to be processed in a certain amount of time. Such an arrangement may be advantageous at a placement area 102 where numerous different types and/or sizes of materials need to be removed. Alternatively, mobile or modular aggregate processing facilities may be placed in series, each separating discrete particle size fractions or material types from the slurry.

Similarly, in a system 100 which includes multiple water clarification packages 108, the water clarification packages 108 may be connected in parallel with each other. This may allow a greater volume of water to be clarified within a certain amount of time. Such an arrangement may be advantageous at a placement area 102 where a large amount of clay and/or silt is expected to be removed from the water. Multiple water clarification packages 108 may also provide redundancy to reduce downtime. As water clarification package 108 may perform chemical processes which may be more prone to failure or require more maintenance than other portions of the system 100, redundancy may be preferred. If a system 100 includes two or more water clarification packages 108, the system 100 could continue to clarify water even if one or more water clarification packages 108 was out of service. For example, the system 100 illustrated in FIG. 6 includes two water clarification packages 108. The water clarification packages 108 may be connected in parallel with each other, such that both water clarification packages 108 receive slurry as an input from the aggregate processing facility 106 and both produce clarified water which may be returned to the placement area 102.

In another aspect, the present disclosure relates to a method of renewing a placement area. The method will be described with reference to FIGS. 1-6 which are described above; however, the method may be performed using a placement area renewal system described above or with a different system designed to perform similar functions. Further reference is made to FIGS. 7A-7D and 8. A method in accordance with the present disclosure may include all of the steps disclosed below, some subset of the steps disclosed below, and/or a combination of some or all of the steps disclosed below with other steps.

Figure 7A:
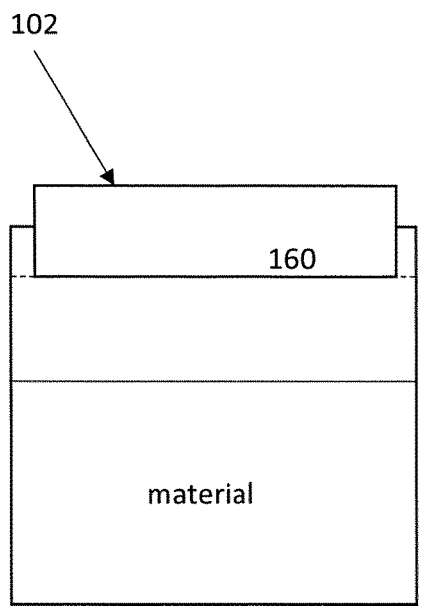
FIGS. 7A-7D is a cross-section of a placement area during use of a renewal system in accordance with the present disclosure.
Figure 8:
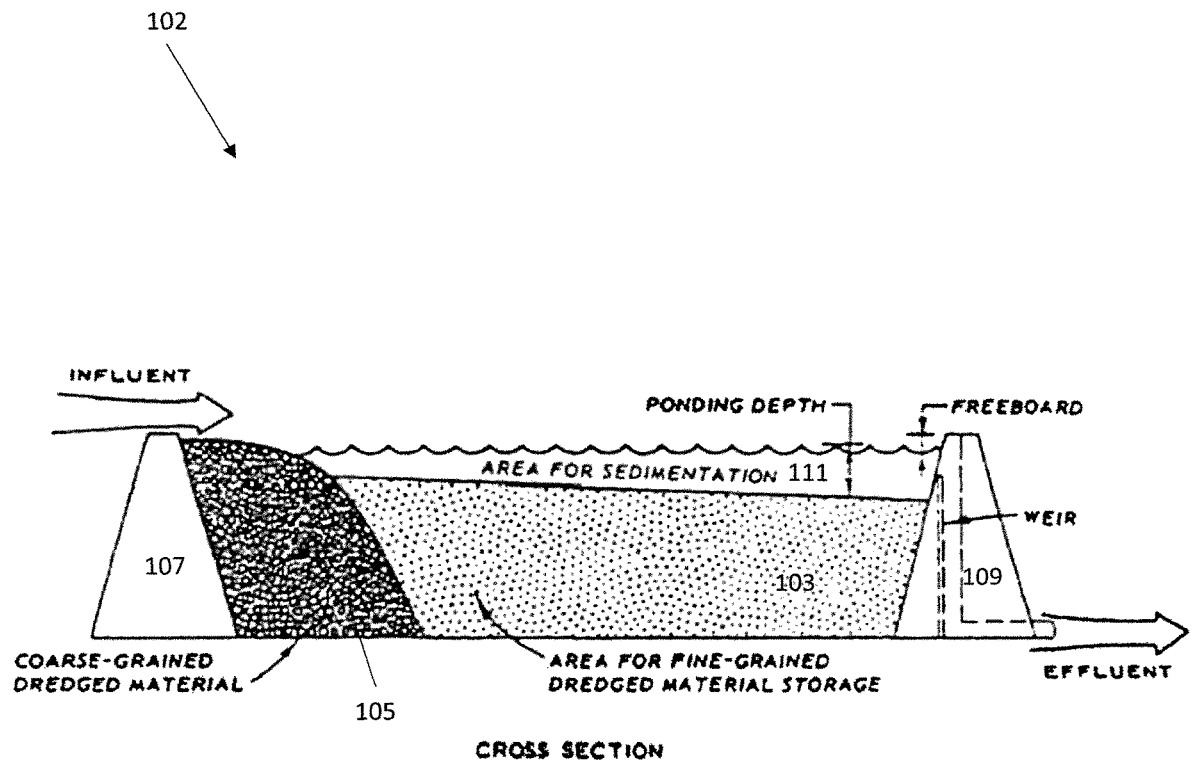
FIG. 8 is a placement area in accordance with the present disclosure.

Prior to performing the method disclosed herein to renew a placement area, the placement area may be filled with dredge material, as shown in FIGS. 7A and 8. The material within the placement area may be material removed from a waterway removal site and may comprise a mixture of solids and liquids. After the placement area is filled to capacity with material, a renewal method according to embodiments herein may be performed to allow reuse of the placement area and/or recovery of materials from the placement area.

The material in the placement area may be partially dried, fully dried, or fully wet when methods herein are initiated.

As discussed above, the material disposed in the placement area 102 may comprise a mixture of solids and liquids. The liquids may primarily include water and may further include chemicals, hydrocarbons, or any other liquid that may be found in a ship channel, port, or other body of water which is dredged. The solids may include a wide array of materials including sand, gravel, clay, debris, rock, and other materials. The particular composition of the material in the placement area 102 may depend on the location from which the material was dredged. For example, some dredged sites may be primarily composed of rock, while others may be primarily composed of clay. Different dredge sites may include different amounts of oversize materials and debris, such as tires, packaging materials, fabric, etc. Further, different types of rock and gravel may be found at different dredge sites. The composition of the placement area material may determine what equipment is selected to remove and process that material.

In some embodiments, material from more than one dredge site may be disposed in a single placement area 102. In such embodiments, the composition of the material in the placement area 102 may vary over the area or the depth of the placement area 102. Material may be disposed in the placement area 102 in layers, such that a deepest region of the placement area 102 contains material from a first dredge site, while a shallowest region of the placement area 102 contains material from the most recent dredge site. In some placement areas, the layers may mix, or heavier material from recent dredge sites may settle into older layers, depending upon timing of the placement into the dredge site, wetness of the previously placed material, and the composition of the materials in each layer (e.g., slurry consistency and composition, and caking/crusting of the exposed portions prior to addition of more material to the placement area may impact the layering or mixing of placed material).

FIG. 8 illustrates an exemplary placement area 102 which has been filled with material. The placement area 102 is bounded by levees or levee sections 107, 109. Material may flow into the placement area 102 over a first levee section 107 and may flow towards a second levee section 109. The second levee section 109 may include a weir, and may allow liquid to flow out of the placement area 102. As illustrated, in some embodiments, the influent material may include both coarse-grained material 105 and fine-grained material 103. The materials 103, 105 are spatially segregated due to settling during flow into the placement area 102, such that the coarse-grained material 105 may remain largely concentrated proximate the first levee 107. A layer of liquid 111 may form on top of the materials 103, 105 during filling of the placement area with dredged material. The material profile illustrated in FIG. 8 is exemplary, and not all placement areas will have such a well-defined distribution of materials, as the influent may be introduced at more than one location, at different flow rates (different settling rates), and other factors.

When it is desired to renew a placement area 102, the material in the placement area 102 may be tested to identify the specific composition of the materials and/or their distribution/location within the placement area. For example, the material may be tested to determine the relative amounts of sand, gravel, debris, clay, hazardous materials, and other components. The composition of the material may be used to determine what equipment to use in the system. As another example, the specific sediment collection areas in a water clarification package 108 or an aggregate processing unit 106 may be determined based on the composition of the material determined via the analyses. A dredge barge 104, as well as pump and hose sizing, may be chosen based on the size and hardness of the solid particulates in the placed material. The moisture content of the material may also be tested and may be used to make decisions about the equipment in the system 100.

As discussed above, a placement area 102 may include different types of materials in different areas or at different depths. Therefore, it may be planned to use different system 100 components at different times during the performance of the placement area renewal method. For example, if the placement area 102 has a first composition above a certain depth and a second composition below a certain depth, the equipment may be changed once the material of the first composition has been removed from the placement area 102. In some embodiments, if the placement area 102 contains different compositions at different depths, equipment suited to handling all of the different compositions may be selected.

In some embodiments, the material may be tested to detect the presence of hazardous and/or desirable trace materials. In some embodiments, testing may comprise spot testing, where material is taken from a small number of selected locations for testing. In some embodiments, testing may include grid testing, where material is taken from specified locations arranged on a two-dimensional or three-dimensional grid within the placement area 102.

If hazardous material is detected within the placement area 102, operations may be halted until the hazardous material can be safely handled. In some instances, the hazardous material may be quarantined, and the renewal method described herein may be performed within the remainder of the placement area 102. Quarantine of the hazardous material may be performed using any technique known in the art. Examples of hazardous materials may include hydrocarbons, lead, and toxic or flammable chemicals.

If desirable trace materials are detected, equipment and techniques may be added to the placement area renewal system 100 and methods disclosed herein to recover the desirable material. Desirable trace materials may include minerals or metals, specifically those with commercial applications.

A placement area renewal system 100 may be brought to the placement area 102 and the components of the placement area renewal system 100 may be connected. The placement area renewal equipment may include any of the equipment described above and illustrated in FIGS. 1-6, including one or more aggregate processing facilities 106 and one or more water clarification packages 108, as well as associated auxiliary equipment.

Before the system 100 is brought to the placement area 102, the placement area 102 and the surrounding land may be analyzed to determine what components or processing equipment should be included in the placement area renewal system 100 and where the components should be placed when the system is assembled. The specific equipment included in the placement area renewal system 100 may be determined based on properties of the placement area 102, including its size and the composition of the material it contains, as well as properties of the surrounding area, such as how much space is available that can support large equipment. The components of the placement area renewal system 100 may also be chosen based on the rate at which it is desired to renew the placement area 102. In some embodiments, modifications may be made to the land surrounding the placement area 102, such as building temporary or permanent roads that can carry system 100 components or providing support for land which is intended to hold system components. Space may be cleared on the land around the placement area 102 to serve as product stockpiles 140, 141, 142, 154. In some embodiments, sources of water and power may be readily available around the placement area 102, while in other embodiments, water and/or power sources may be added proximate the placement area 102 before the placement area 102 is renewed. In some embodiments, components of the system 100 may be permanently or semi-permanently located at the placement area 102, while in some embodiments, most or all of the components of the system 100 may be brought to the placement area 102, such as via mobile or modular units.

A dredging schedule may be devised based on the information described above, including information about the composition of the material in the placement area 102 and the land around it. The schedule may further be dictated by desired end uses for the materials which are to be removed from the placement area 102, as well as the time allotted for renewal. The schedule may be devised in conjunction with the design of the system, which as discussed above, may be determined based on the features of the placement area 102 and surrounding land as well.

Once the land around the placement area 102 has been prepared as necessary, the components of the system 100 may be brought to the placement area 102 and disposed in the planned locations. Flow lines, including a raw dredge feed line 132, a slurry line 144, and water return line 169, may be connected between the equipment as described above. Connections between the equipment and flow lines may be tested for safety.

Figure 7B:
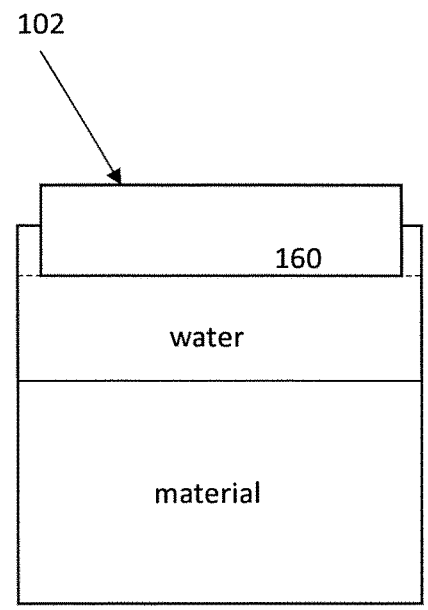

If necessary, water may be added to the surface of the placement area 102. As shown in FIG. 7B, the volume of water added may fill the placement area 102 to a constant depth line 160. Water may be added to a depth sufficient to allow the dredge barge 104 to float above the material in the placement area 102. In some embodiments, about five to seven feet of water may be added. Water may be added from an external water source (not shown) proximate the placement area 102 in this step.

The dredge barge 104 may be disposed in the placement area 102, such that it floats on the water added in the previous step. The dredge barge 104 may be configured such that it may be readily propelled into and through the water.

The material disposed in the placement area 102 may be dredged. Dredging may be performed using the dredge barge 104, for example. The dredge barge 104 may operate as described above. While dredging is being performed, the dredged material may be transported to an aggregate processing facility 106. The dredged material, which may be considered a raw dredge feed, may be transported, for example, via a raw dredge feed line 132.

The raw dredge feed may be processed to remove large particulates. In some embodiments, oversize debris, gravel, and sand may be removed from the raw dredge feed in this step, such as by using an aggregate processing facility 106. Removing large particulates from the dredged material may include flowing the dredged material across and/or through one or more scalper screens 136, such as shakers or hydrocyclones 162. Each scalper screen 136 and hydrocyclone 162 may remove particulates of a particular size. After the particulates have been removed, a slurry of clay, silt and uncaptured sands may be output by the hydrocyclone(s) 162, which may then exit the aggregate processing facility 106 to slurry line 144 via a sump and pump 138.

When particulates are removed from the dredged material by the aggregate processing facility 106 or the water clarification package 108, they may be disposed in product stockpiles 140, 141, 142, 154, or waste stockpiles 142. At stockpiles 140, 141, 142, 154, the particulates may be further processed, for example to remove dirt or adhered chemicals. The particulates may also be processed using crushing equipment or pugging equipment. The crushing equipment may crush gravel or other materials to a desired size, after which the crushed pieces may be screened as necessary. The pugging equipment may be used to mix multiple materials together to homogenize a blend for a particular end use. For example, sand and clay may be mixed together. After the particulates meet standards for recycling or reuse, they may be stored proximate the placement area 102 or may be transported to a secondary location for use or sale. The particulates may be disposed on a truck or another vehicle such as a barge or train car to facilitate transport. A front-end loader, or other equipment may be used to dispose the particulates on the vehicle and a truck scale may be used to measure the vehicle and track and record material removal.

The slurry output by the water clarification package 108 may be processed to remove small particulates and to produce clarified water. In some embodiments, clay and silt may be removed from the slurry in this step. A water clarification package 108 may be used in this step, for example. Removing small particulates from the slurry may include flowing the dredged material through one or more sediment collection areas 148, which may include additional equipment such as hydrocyclones, centrifuges, settling tanks, or filters. Each sediment collection area 148 may remove particulates of a particular size. In some embodiments, additives may be added to the slurry to facilitate separation of the small particulates.

Removing small particulates from the slurry may produce clarified water. Clarified water may be water that is sufficiently free of contaminants to be released back into the environment. In some embodiments, the water from which the small particulates have been removed may be further treated to remove chemicals or other components before it may be considered clarified water. The clarified water may be output from the water clarification package 108. The clarified water may be returned to the placement area 102 in some embodiments.

One skilled in the art will recognize that during performance of a placement area renewal process, dredging, large particulate removal, and clarification may be performed simultaneously. Dredging may be initiated prior to the initiation of particulate removal and clarification, as may be required in a sequenced system 100 startup. Likewise, the dredging may be halted prior to halting of particulate removal or clarification, as may be required in a sequenced system 100 shutdown. Therefore, there may be some times at which only one or two of these processes are being performed and other times when all three processes are being performed.

Figure 7C:
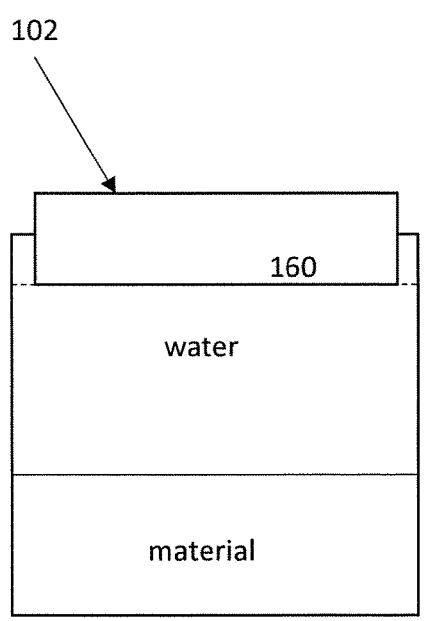

One will further recognize that any time dredging is being performed, material is being removed from the placement area 102. Throughout this method, it is desired that the surface of water in the placement area 102 is at a relatively constant depth line 160. This depth line may include both the material originally filling the placement area 102 and water added to the placement area 102. Maintaining this depth may ensure that the dredge barge 104 functions correctly and may allow the dredge barge 104 to be readily removed from the placement area 102. FIG. 7C illustrates a placement area 102 in which some of the material has been dredged and replaced with water, such that the placement area 102 is filled to the constant depth line 160.

In order to maintain a constant fill volume in the placement area 102 at the constant depth line 160, water may be added to the placement area 102 while dredging is being performed. If clarified water has been produced, the clarified water may be added to the placement area 102. In some embodiments, the clarified water may be added to the placement area 102 via a water return line 169. If no clarified water has been produced, or if additional water is needed to maintain the depth at the constant depth line 160, water may be added from an external water source (not shown).

Figure 7D:
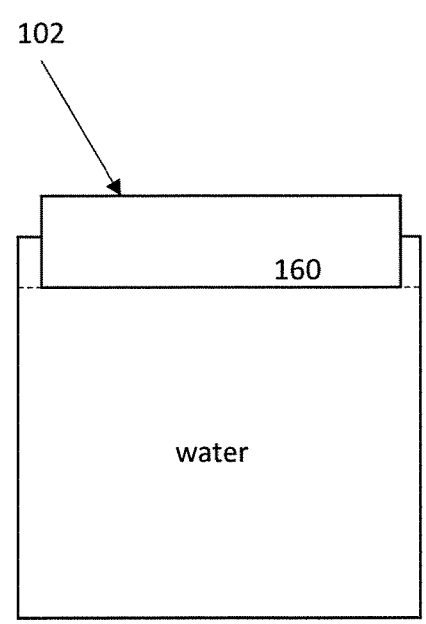

Following processing of the material in the placement area, the dredge barge 104 may be removed from the placement area 102. This may occur after all of the material from the placement area 102 has been removed, as shown in FIG. 7D. The placement area 102 may be completely filled with water at this point. The water level may be at the constant depth line 160, and this may allow the dredge barge 104 to be readily removed from the placement area 102.

To allow the placement area to be re-used for placement of additional dredged material from nearby waterways and the like, the water in the placement area may be pumped out of the placement area. One or more pumps (not shown) may be disposed in the placement area 102. The pumps may be connected to a storage tank or other vessel via flow lines, such that the water may be removed from the site of the placement area 102 and pumped to the water clarification package 108 for final clarification before flowing into water buffer tank 168 and then discharged into the environment. In some embodiments, the flow lines may direct the water to a nearby ship channel or other body of water, or may be used to irrigate nearby agricultural fields or other means of disposal or use of the clarified water remaining in the placement area. The pumps may be configured such that a placement area 102 may be actively dewatered within a few days, for example. After the placement area 102 is dewatered, it may be ready to receive placed materials from dredging operations in nearby ship channels and waterways.

As discussed throughout this application, the placement area renewal systems and methods disclosed herein may provide numerous advantageous effects. First, they allow for the renewal of placement areas, which is not currently performed. This may permit conveniently located placement areas to be refilled with debris from ongoing dredging operations in ports, ship channels, or other seafloor structures. Second, they allow for the reuse of materials disposed in placement areas. This reduces overall waste and allows for these now separated or blended materials to be commercially used whereas before they had largely been considered waste. Third, they allow for the partial or entire volume of a placement area to be renewed, thereby avoiding unproductive volume. Fourth, they enable active dewatering of placement areas. This may significantly reduce the time necessary for a placement area to be ready for reuse, compared to the current standard of passively allowing a placement area to dry out over an extended period of time, which may be years. Actively dewatering a placement area may thereby reduce downtime and increase the financial value of a placement area.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for renewing a placement area, the method comprising:
    disposing a dredge barge inside a placement area containing materials dredged from one or more other locations and disposed within the placement area;
    dredging material from the placement area;
    processing the dredged material;
    adding water to the placement area to maintain a flotation level of the dredge barge;
    removing the dredge barge from the placement area; and
    removing the water from the placement area.

2. The method of claim 1, wherein the processing the dredged material comprises:
    separating the dredged material to recover an oversize debris fraction and a slurry comprising water, clay, silt and/or sand; and
    separating the slurry to recover a water fraction and one or more fractions comprising silt, clay and/or sand fraction.

3. The method of claim 2, further comprising clarifying the water fraction.

4. The method of claim 3, wherein adding water to the placement area comprises returning the clarified water to the placement area.

5. The method of claim 4, wherein adding water to the placement area further comprises adding water from an external source to the placement area.

6. The method of claim 2, wherein separating the dredged material comprises separating the dredge material by size exclusion to recover the slurry and one or more particulate fractions, wherein the one or more particulate fraction includes one or more of a large trash fraction, a gravel fraction or other oversize usable material fraction, or a sand fraction.

7. The method of claim 1, wherein processing the dredged material comprises mixing an additive with the dredge material or a fraction thereof.

8. The method of claim 1, wherein processing the dredged material comprises treating the dredge material or a fraction thereof.

9. The method of claim 1, further comprising flooding the placement area with water prior to disposing the dredge barge within the placement area.

10. The method of claim 1, further comprising testing material disposed in the placement area to determine a composition of the material.

11. The method of claim 10, wherein the testing comprises taking samples from multiple zones of the placement area.

12. The method of claim 10, further comprising planning a dredging schedule based on the testing.

13. The method of claim 1, wherein removing the water from the placement area comprises:
    disposing a pump in the placement area;
    pumping water out of the placement area; and
    removing the pump from the placement area.

14. The method of claim 1, further comprising one or more of:
    locating a mobile aggregate processing facility proximate the placement area;
    locating a mobile water clarification facility proximate the placement area;
    fluidly connecting the mobile aggregate processing facility to the dredge;
    fluidly connecting the mobile aggregate processing facility to the mobile water clarification facility;

disconnecting the mobile aggregate processing facility from the dredge;
disconnecting the mobile water clarification facility from the mobile aggregate processing facility; or
removing the aggregate processing facility and the mobile water clarification facility from their respective positions proximate the placement area.

15. The method of claim 1, further comprising:
disposing supplemental equipment selected from the group consisting of crushing equipment, pugging equipment, other processing equipment as needed to facilitate further processing of various material types, loaders, and weigh scales proximate the placement area.

* * * * *